March 8, 1955 M. MAUL 2,703,524
RECORD CARD CONTROLLED RECORDING MACHINE
Filed June 16, 1952 9 Sheets-Sheet 1
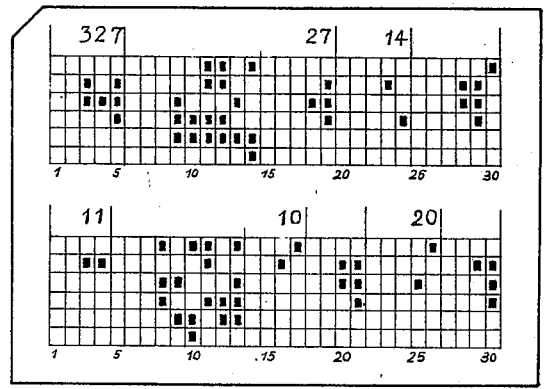
Fig. 1
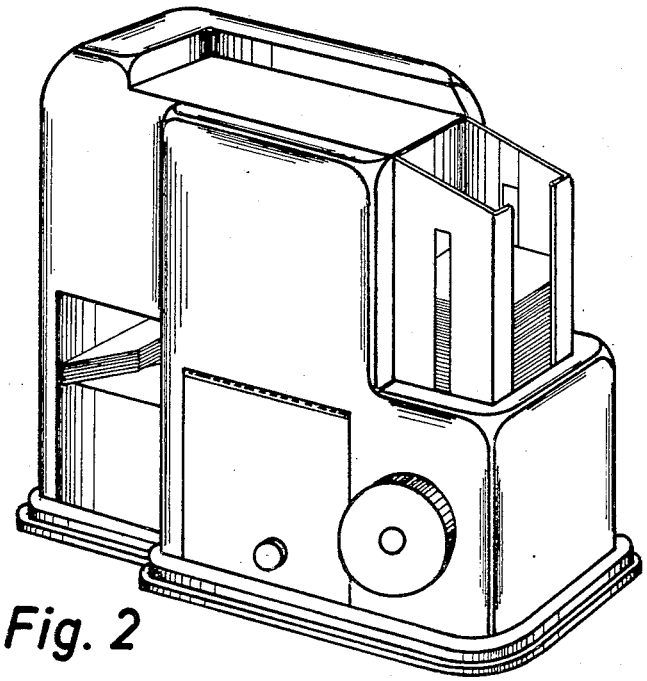
Fig. 2
Inventor:
Michael Maul
Atty.

March 8, 1955  M. MAUL  2,703,524
RECORD CARD CONTROLLED RECORDING MACHINE
Filed June 16, 1952  9 Sheets-Sheet 3

Inventor:
Michael Maul

March 8, 1955  M. MAUL  2,703,524
RECORD CARD CONTROLLED RECORDING MACHINE
Filed June 16, 1952  9 Sheets-Sheet 2

Inventor:
Michael Maul
BY
Atty.

March 8, 1955  M. MAUL  2,703,524
RECORD CARD CONTROLLED RECORDING MACHINE
Filed June 16, 1952                                          9 Sheets-Sheet 4

Inventor:
Michael Maul

March 8, 1955     M. MAUL     2,703,524
RECORD CARD CONTROLLED RECORDING MACHINE
Filed June 16, 1952     9 Sheets-Sheet 5
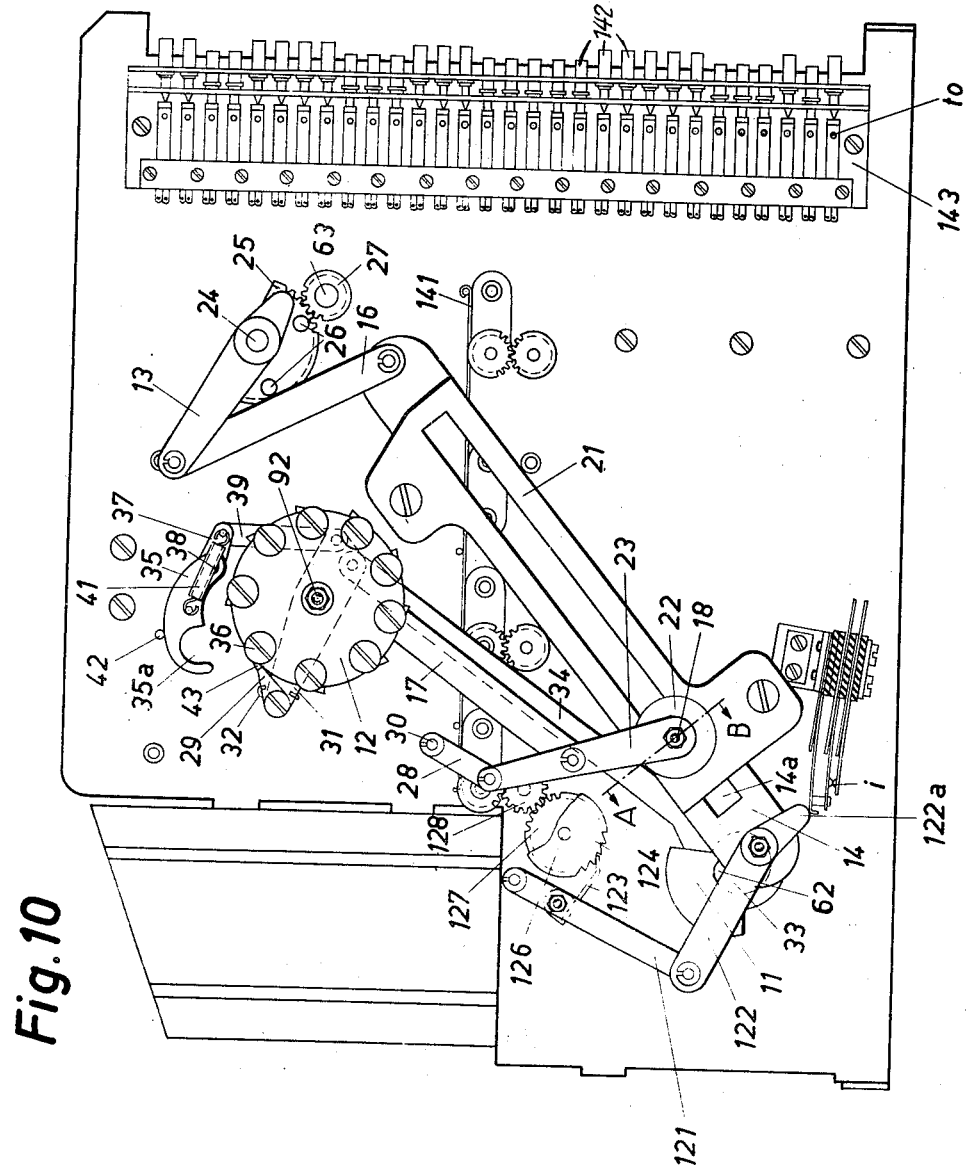
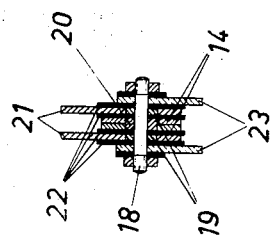
Inventor:
Michael Maul
By March 8, 1955   M. MAUL   2,703,524
RECORD CARD CONTROLLED RECORDING MACHINE
Filed June 16, 1952   9 Sheets-Sheet 7

Inventor:
Michael Maul

March 8, 1955   M. MAUL   2,703,524
RECORD CARD CONTROLLED RECORDING MACHINE
Filed June 16, 1952   9 Sheets-Sheet 8

Inventor:
Michael Maul
By

March 8, 1955  M. MAUL  2,703,524
RECORD CARD CONTROLLED RECORDING MACHINE
Filed June 16, 1952  9 Sheets-Sheet 9

Inventor:
Michael Maul

United States Patent Office 2,703,524
Patented Mar. 8, 1955

2,703,524
RECORD CARD CONTROLLED RECORDING MACHINE

Michael Maul, Schwabach, near Nurnberg, Germany

Application June 16, 1952, Serial No. 293,861

Claims priority, application Germany June 19, 1951

2 Claims. (Cl. 101—93)

The present invention relates to record card controlled printing machines of the kind known as interpreting machines for record cards. The record cards are provided in a well known manner with index marks represented in record columns and the mark or marks in each column represent symbolically numerals or alphabetic characters. Interpreting machines of the type to which the invention relates analyze the index marks and print upon the card itself the numerals or characters represented by the analyzed marks. Selection means may be provided in such machines for selectively eliminating the control of the printing means by the analyzing means to effect a selective printing operation on the successive cards passing through the machine.

It is one of the main objects of the present invention to provide an interpreting machine of the kind referred to for so called multi-deck record cards, having a plurality of adjacent record columns in each deck, said machine permitting interpretation of all decks in a single card passage and yet permitting selective elimination of the control of the printing means by the analyzing means in each deck.

A further object of the invention is to provide for said purpose a very simple and small machine having only one set of analyzing means common to all decks, printing means common to all decks and provided for each column of the card, but a separate set of selection means for each deck for effecting said elimination in order to bring about a selective printing operation on the successive cards.

Another object of the invention is to provide a machine of the kind above referred to having only a single row of analyzers for simultaneously analyzing all columns of one deck said row of analyzers being common to all decks.

Still another object is to provide, in a machine of the kind above referred to, a separate row of selection keys for each deck to cause the aforesaid elimination.

Though the present invention may be applied to recording machines of the most varied types, in the following it is described in connection with an embodiment that may be termed a "perforation interpreter" and in which the line by line recordings are associated with the perforation decks of the controlling card itself. A similar machine is for instance known from U. S. Patent 2,311,471. In this machine all columns of a deck are simultaneously analyzed and printed. In contradistinction to the invention, however, analysis is not effected by a single set of analyzers, but by two sets of analyzers of which the set of analyzers corresponding to the deck not being treated remains ineffective.

In order to permit printing of a card having a plurality of decks, the card must run repeatedly through the machine and the machine must be manually adjusted upon the various decks. This machine lacks the possibility of printing the card completely in a single passage and also lacks a switch board or the like having manually presettable column selectors for each deck.

It is known per se to provide a column selection in recording machines having a plurality of perforation decks such as in the German Patent 747,603, in which the index marking machine is provided as a "repeating punch" and at the same time as a "duplicating punch." In this machine, however, neither the analysis nor the recording is effected simultaneously in all columns of the perforation deck, but the analysis and the recording are effected column by column for several decks at the same time. Accordingly, this manner of operation permits a considerably lower efficiency compared with that of a machine according to the present invention. Moreover, the known machine also lacks a set of analyzers common to all decks and a common recording mechanism, nor is the column selection effected by a manually presettable column selector which becomes automatically effective one by one upon operation of the various decks. The column selector, which is permanently associated with each deck, consists in the prior patent in a perforated selector card which must be moved in synchronism with the card analysis and recording which letter must be also permanently associated with each deck separately.

Frequently it is of practical importance that in the machine according to the invention certain columns may be eliminated from recording in such a way that any desired columns of any desired perforation deck can be suppressed in the recording operation of the cards which is effected in a single card passage only. For instance, there are cases in which it is desirable from the beginning to print from the whole punched card only certain particularly important data on the card, while excluding all other perforated data from reproduction in printed form. Further it may occur that data are printed in the first run, while in a second run, printing is to take place only from columns which have subsequently been punched. If, for example, a card contains the factors of a multiplication to be carried out it is desirable that these factors are printed on the card before obtaining the product for the purpose of verification with respect to the original records. If then the product is punched into the card mechanically, in a second run the products and possibly further data related thereto may be printed on the card. In this case, however, the factors and data already printed in the first run are not to be printed again since the digits do not coincide exactly and for this reason unclear printing may be caused.

Further objects will be apparent from the following description of a preferred embodiment of the invention in which perforated multi-deck record cards punched according to hole combinational code can be interpreted.

Referring to the drawings wherein I have shown the preferred form of my invention Fig. 1 shows a card printed in the interpreter, certain punched columns having, however, been excluded from printing.

Fig. 2 shows a perspective general view of the machine.

Fig. 10 shows the rear view of the machine with the cover removed.

Fig. 11 shows a section according to line A—B through the crank drive of Fig. 10.

Principle of the operation

The interpreter translates both decks of a double deck card one after the other in a single card passage, while, at the same time, any desired column of either deck may individually be "eliminated," which means that no transfer takes place in respect of the "eliminated" column. The result of the analysis is printed on the analyzed card by means of a printing mechanism. The elimination of certain columns is obtained by interrupting the controlling current circuit for the column to be eliminated by means of a switch or a key. For each deck there is provided an associated elimination device (switch or key). These elimination devices are switched into the controlling current circuit consecutively, depending on which deck is under the analyzing device.

Figure 5:
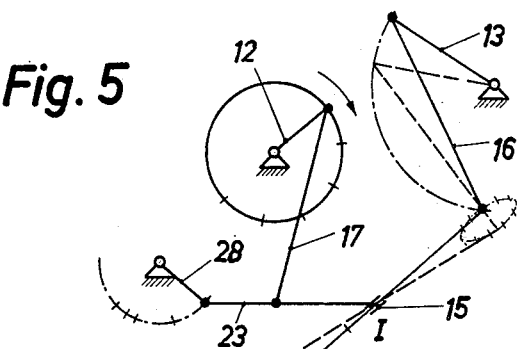
Figs. 5 to 9 show diagrammatically the crank drive in its various positions.
Figure 6:
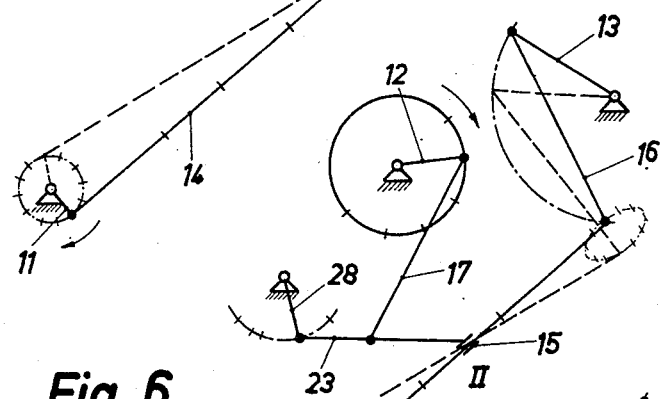
Figure 7:
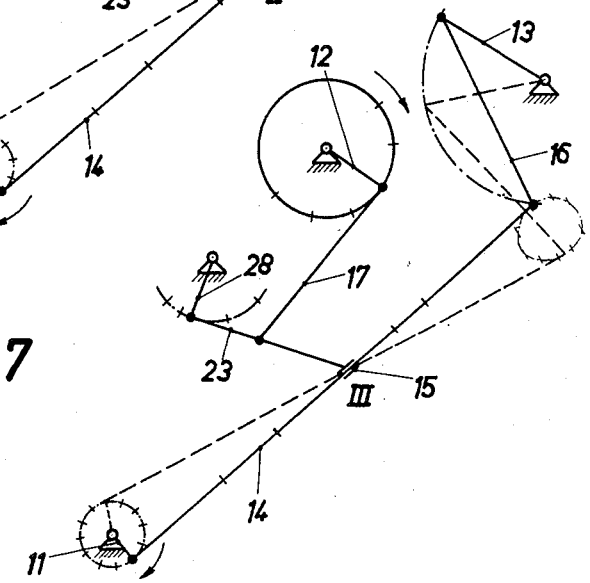
Figure 3:
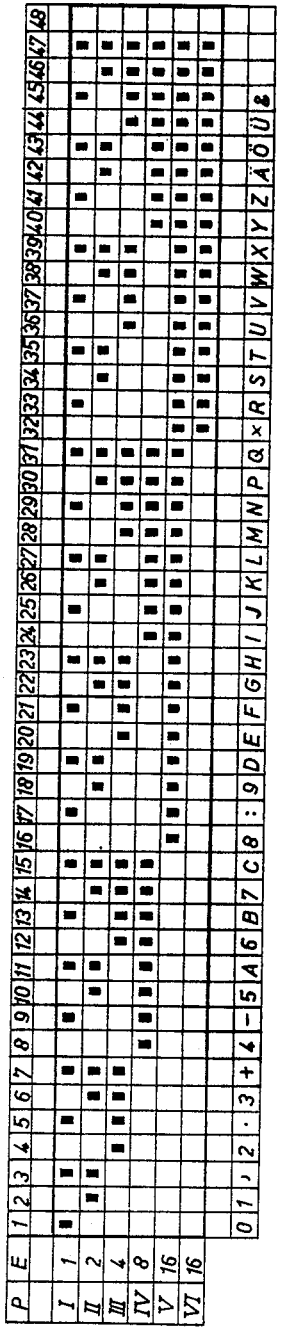
Fig. 3 shows the code according to which the cards are punched.

The mechanism of the interpreter is so constructed that it operates according to the code shown in Fig. 3. The code is so arranged that the interpretation of a character is given by a value resulting from the addition of the partial values associated with the various hole positions. The valuations for the various rows are selected in a way which allows a certain value to be indicated only by a single hole combination. In determining the code it has further been assumed that for numerals, alphabet and other characters about 45 hole combinations are necessary. In order to obtain a certain margin the code was chosen with 47 characters plus a vacant field thus permitting in Fig. 3 the insertion of two further characters, if desired.

With the exception of the numerical characters, the characters can be associated arbitrarily with the various hole combinations, but the position of a character within the row of characters is determined by the numerical interpretation of the hole combination. Accordingly, in arranging the type on a type wheel the latter must be divided into 48 equal sections. A particular character is associated with each section.

The printing device consists of a row of adjacent type wheels. A common drive is provided for all type wheels to which drive the type wheels may be clutched. Clutching takes place as soon as a hole has been detected in the analyzed position. Declutching is effected automatically as soon as the type wheel has been adjusted to the corresponding value and the card is moved to the next hole position. Each column has six hole positions and printing will only take place if all six positions of a column have been analyzed. Accordingly, clutching can be effected for each position and declutching will automatically take place past each position wherever clutching has been effected. In this way it is possible that the type wheel may be adjusted several times before printing takes place.

The drive is constructed in such a manner that its displacement is varied from position to position except between the two lowermost positions. If several holes are provided in a column the displacements determined by their values will be added one by one. If it is assumed for instance that the third and fifth position of a column are punched the type wheel will be moved, upon the analysis of the position III, through 4 units and upon analysis of the position V through 16 units. Upon analysis of the positions I, II, IV, VI no movement takes place since no hole was provided in any of said positions, and consequently a clutching operation has not occurred. Accordingly, the type wheel had been moved for 20 units, which according to the code corresponds to the character E.

The perforated record card (Fig. 1) is formed as a double deck card. Each deck has 30 columns with 6 hole positions in each column. The perforation columns of both decks are analyzed simultaneously one by one, position by position, and the result of the analysis is transferred to the printing mechanism.

The machine is provided with 30 printing positions, each of the latter is associated with a card column and can be disconnected selectively from the analyzing device by means of keys, separately arranged for the upper and lower decks. The circuit diagram will be described more in detail later on. The printing device is driven by means of a crank drive. The crank drive was chosen because it permits the clutching operation to be quietly and safely effected at one dead centre position and the declutching operation to be quietly and safely effected at the other dead centre position. Further the return movement which necessarily occurs in a crank drive can be used for declutching. The positions of the crank drive which occur during the analysis of one deck are illustrated in the operating diagrams according to Figures 5–9.

The crank 11 is continuously driven with constant speed in clockwise direction (Figures 5 to 10). During each turn of the crank the card is advanced by one hole position. Upon each full revolution of the crank 11 the crank 12 is displaced one step in clockwise direction. This displacement will be described in more detail later on. A rod 14 is pivoted to the crank 11, said rod being mounted for reciprocating movement in the guide 15. (This guide is only symbolically indicated in Figs. 5 to 9 while actually it is constructed differently therefrom.) The right hand end of rod 14 describes an ellipse-like curve. If the guide 15 is moved the curve will change. At the right hand end of the rod 14 a rocker 13 is connected thereto by the link 16 which latter rocks in accordance with the curve. The angle through which the rocker 13 swings is dependent upon the shape of the curve. The guide 15 is now moved in such a way as to cause the various angles of swing of the rocker 13 to be proportioned to each other in the same manner as the values according to Fig. 3. In all five positions (the sixth position is identical with the fifth position) a constant angle must be subtracted in which the rocker runs idle on account of the play between the gears, and other parts. This play is also necessary for another reason and as will be shown later, it is intentionally increased so that the drive can remain stationary at the moment of clutching. If the play were not provided there would always still be a movement of the drive at the dead centre. The moment at which movement ceases would then be decreased to an indefinitely small value.

The position and dimensions of the crank drive have been chosen in such a manner that at the one dead centre of the rocker 13, the guide 15 as well as the auxiliary crank drive cooperating therewith (described later) may be adjusted without changing the position of the rocker 13. This is necessary since the clutch for clutching the registering elements to their drive must be always in the same position independently of the position in which the guide 15 happens to be. It is only necessary to take care that the guide 15 has already reached the positions (indicated in Figs. 5 and 9 by Roman numerals in accordance with the hole position designation) associated with the analyzing positions of the hole positions at the second dead centre of the rocker 13 (indicated in dash lines in Figs. 5 and 9), since the position of this point determines the amount by which the type wheel will be advanced.

The adjustment of the guide 15 is effected by the crank 12. The latter makes one revolution for each card run. Dimensions and positions have been chosen here in such a manner that the unequal distances between consecutive positions of the guide 15 on the rod 14 are transformed into equal movements of the crank 12. This is an advantage in so far as in addition to the step by step shifting also a continuous drive of the crank 12 can be derived from crank 11, if desired.

Figure 9:
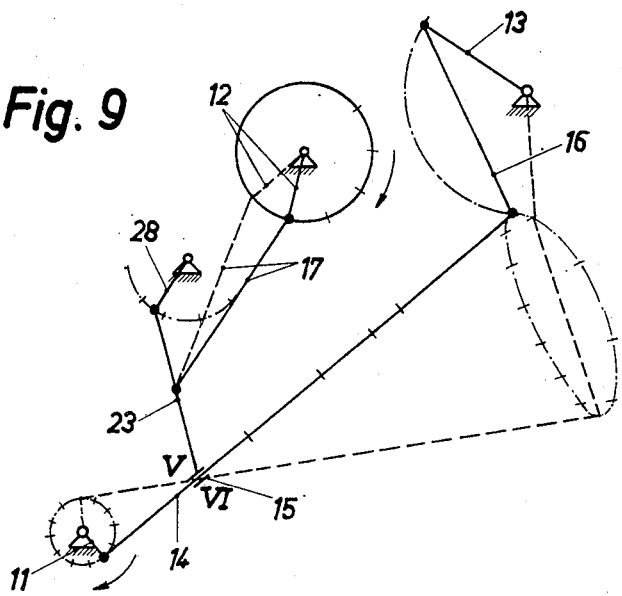

As may be seen from Fig. 3 the same value 16 has been provided for the positions V and VI. The position of the crank drive for these two positions is shown in Fig. 9 and must result, as has been indicated above, in twice the same displacement though the crank 12 is turned for one step. This is obtained by reason of the fact that disposal of link 17 in the V-position shown in full lines in Fig. 9 and also disposal of said link 17 in the VI-position shown in dash-lines gives the same position for the guide 15.

Construction of the crank drive

The actual construction of the crank drive is shown in Figs. 10 and 11. The rod 14 consisting of two adjacent metal sheets is linked to the crank 11. It has a rectangular cut out portion 14a in which can slide a guide piece 20 (Fig. 11). The guide piece 20 is loosely seated and rotatable upon the pivot pin 18. On the pin 18 there are further mounted the two loose guide pieces 19 adapted to slide in the guide bars 21 which are provided on both sides of rod 14 and are fast to the base plate. As a protection against mutual interference of rod 14 and the guide bars 21 and, in order to prevent the guide pieces from sliding off, disks 22 are provided between the guide pieces 20 and 19. The arrangement of the guide pieces permits sliding of the pin 18 in the guide bars 21, sliding of the rod 14 on the pin 18 and rocking of the rod 14 relative to the fixed guide bars 21 about the axis 18. The displacement of the guide pieces is effected by the two links 23 which are screwed fast to the pin 18. At the right hand end of the rod 14 the rocker 13 is connected by the link 16. The rocker 13 is rotatably mounted on the stud 24 which is fast to the base plate and upon which also the toothed segment 25 can turn loosely. The rocker can take the toothed segment 25 with it by engaging the two stops 26.

The position of the stops has been chosen in such manner that upon the change of direction the rocker 13 moves idly through a certain angle with respect to segment 25. This idle movement is necessary in order that when clutching of the registering mechanism to the drive therefor takes place (as before mentioned) at the one dead centre, the drive is stationary. The toothed segment 25 meshes with the pinion 27 from which the drive for the printing mechanism is derived.

The positioning of links 23 and therewith of guide 15 is effected through link 17 by crank 12 which in practice takes the form of a ratchet wheel. The rocker 28 connected to the links 23 is rotatably mounted at its right hand end on the stud 30 which is fast in the casing. The rocker 28 is necessary in order to safeguard the proper positioning of the link 23 and thereby also of the guide.

Movement of the ratchet wheel 12 is effected by pawl 29. The pawl 29 is rotatably mounted on the rocker 31 and is resiliently held against the ratchet wheel 12. The rocker 31 is driven by an eccentric 33 and the eccentric rod 34. The eccentric 33 is mounted upon the same shaft as the crank 11 so that the rocker 31 will rock back and forth once at each revolution of the crank 11. By this means the ratchet wheel 12 will be moved one step by means of pawl 29. By this movement the movement of the guide 15 is effected through links 17 and 23, the link 17 being pivotally mounted on the ratchet wheel 12.

The position of the guiding pieces in the guide bars 21 must be exactly defined after the rocker 13 has reached the outer dead centre. This is necessary since at this moment declutching of the type wheel takes place. As indicated above, this dead centre position also indicates the value for the associated position. During the remaining time the guide may be moved, this movement, however, has no influence upon the adjustment. The position of the guide has no influence upon clutching since the crank drive and the position of the guide bars 21 have been chosen in such manner that the position of the one dead centre is independent of the positioning of the guide.

Provision must be made that forces occurring and tending to move the guide from the predetermined position which must in no event occur at the outer dead centre, cannot have any influence. Therefore the ratchet wheel 12 is arrested at this moment and is blocked in both directions of rotation so that no unforseen movements can arise. Blocking is effected by the lever 35 with its semicircular cut out portion 35a. The cut out portion 35a of lever 35 can engage over the screw heads 36 thus blocking the rotation of the crank disk 12 in both directions. This blocking must be maintained for some time. Moreover, a quick engagement is desired which is obtained by a snap-action mechanism. The arm 37 is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of arm 37 the lever 35 will now continuously snap back and forth between the stop 42 and the screws 36. The dead centre has been positioned in such a manner that the lever 35 engages the screw 36 when the guide or the screws 36 respectively have reached the proper position.

In order to compensate for tolerances and play and to permit an exact adjustment of the strokes the various screws 36 or the teeth 43 of the ratchet wheel are individually adjustable. The ratchet wheel 12 is constructed as a simple disk to which each of the teeth 43 is fastened by means of a screw 36. The screw holes in the disk are somewhat larger thereby providing a limited adjustability. In order to compensate for difference in the division which possibly might occur in assembly, a larger stroke has been provided for the pawl 29 than for the normal division.

The six screws 36 and teeth 43 that are necessary for the various positions of the guide 15 are spaced a smaller distance from each other than the remaining three.

These three screws are required in order to restore the crank drive, for positioning the guide, to its home position again. During this time also printing and deck change will take place. The distance between these three screws has been somewhat increased in order that in the interval between two cards which corresponds to four normal shifting steps, only three steps may occur.

Clutch system for type wheels

The back and forth movement of the pinion 27 (Fig. 10) is transferred through a gear mechanism, which will be referred to later, to shafts 44 having the gears 45 (Figs. 13 and 14) fast thereon. The arrangement of the wheels in Figs. 13 and 14 does not exactly correspond to the position in the machine. This arrangement has been chosen in order to permit a clearer view of the section in Fig. 14. For each type wheel a pinion 45 is provided. The latter meshes with the pinion 46 which is firmly pressed upon the ring 47. In the ring 47 there is provided a slot 47a accommodating the pawl 48 and the spring 49. By spring 49 the pawl 48 may always be held in one of two rest positions. The ring 47 rotates upon the teeth of actuating wheel 51. To the actuating wheel 51 the pinion 52 is rigidly fixed, the latter engaging the pinion 53. The actuating wheel 51 is rotatably mounted upon the shaft 50 and the gear 53 is rigidly connected to the type wheel 54.

According to the value of the effective hole position each ring 47, driven by its pinion 45 will be rotated. If the clutch magnet has been energized slightly earlier by a hole in the card, the lever 66 will encounter the pawl 48, which will be pressed into a gap between the teeth of the actuating wheel 51, said pawl taking the wheel 51 with it in counterclockwise direction. Through pinions 52 and 53 the type wheel is thereby moved accordingly. Engagement of the pawl can only occur in a predetermined position which is referred to later on in the circuit diagram. The position of the pawl is determined by the crank drive as has already been mentioned. The movement of the actuating wheel 51 always takes place for a multiple of the pitch so that the teeth will always be again in the proper position for engagement.

Figure 12:
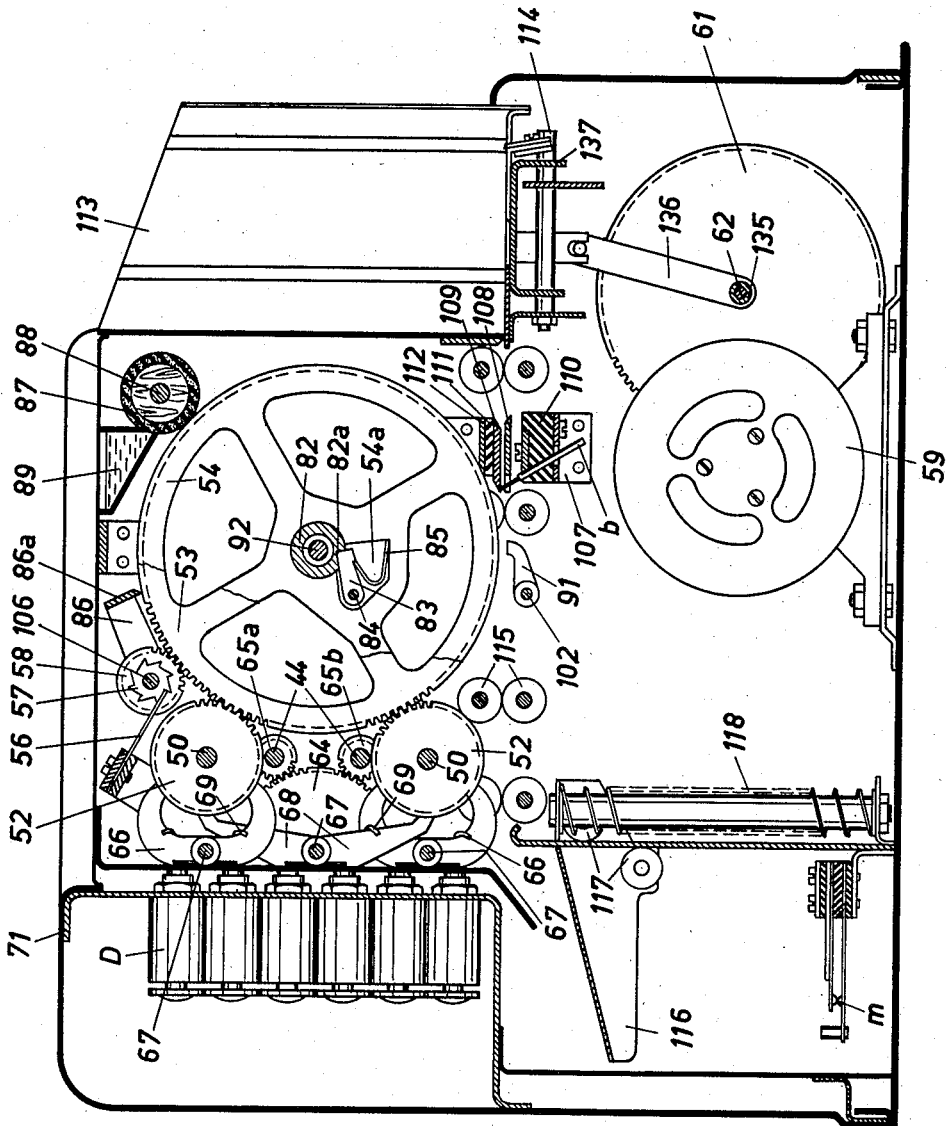
Fig. 12 shows a section through the machine.
Figure 13:
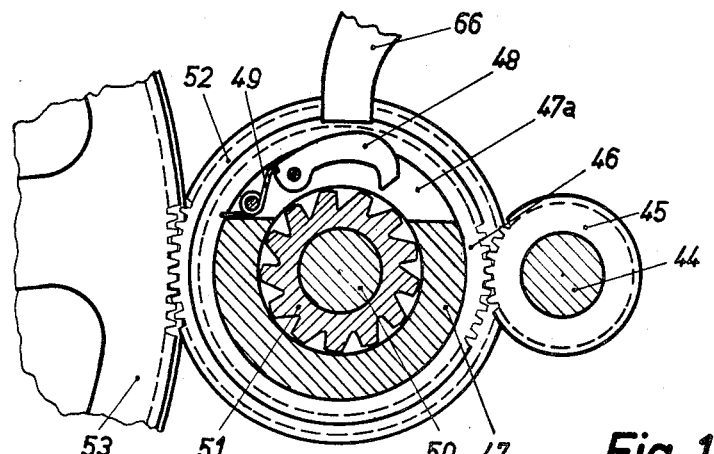
Fig. 13 shows the clutch mechanism for the type wheel in a section vertical to the axis.
Figure 14:
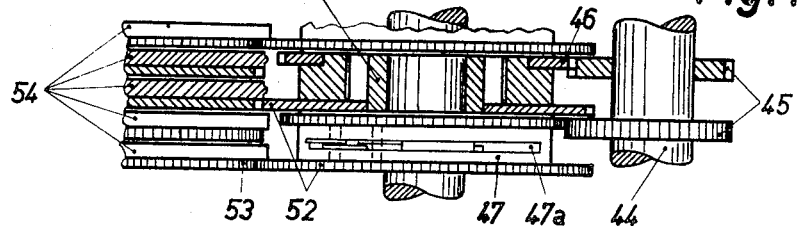
Fig. 14 shows the clutch mechanism for the type wheel partly in section and in plan.

Upon backward movement of ring 47 the type wheel 54 and therewith gear 53 are locked against backward movement by spring 56 (Fig. 12). The spring 56 engages with a locking wheel 57 which is fast to the wheel 58, the latter meshing again with gear 53. Accordingly, also gear 51 is blocked against rotation in clockwise direction (Fig. 13). The pawl 48 is forced outward by the inclined back face of the tooth until it reaches its outer position in which it will then be held by the spring 49. Accordingly, declutching will automatically take place right at the beginning of the backward movement. The ring 47 will now run back until the dead point for the next clutching operation is reached.

Drive of the printing device

The crank drive is arranged at the rear wall of the machine in such manner that it is easily accessible from the rear (Fig. 10). The drive for the crank drive is effected by motor 59 (Fig. 12) through the gear 61. On the shaft 62, on which the gear 61 is mounted, the crank 11 is also mounted. Accordingly, the crank drive runs continuously as long as the machine is in operation. The drive is effected through the described crank drive from pinion 27 through shaft 63 (Fig. 10) to the gear 64 (Fig. 12). Gear 64 is in engagement with the two toothed wheels 65a, 65b, each driving a shaft 44 upon which are mounted the driving wheels for the clutches to the type wheels, said driving wheels being generally indicated at 45. Staggering of the clutch systems in two groups has been chosen in order to obtain a small type pitch, which is dependent on the column pitch.

The arrangement of the clutch magnet requires a further staggering in six groups. The magnets are so arranged that always three groups of magnets operate upon one group of the two groups of clutches. From Fig. 13 it may be seen that the position of pawl 48 or of ring 47 is of no importance for the position of clutch engagement. It is only imperative that during engagement the point of the pawl is always over any one of the tooth gaps of the actuating wheel 51. Accordingly, the position of the pawl is only a question of assembling and of the arrangement of the clutch levers. The position and form of the clutch lever (Fig. 12) has been chosen in this instance in such a manner that as far as possible the same parts may be used and only few mounting points are necessary. The clutch levers are rotatably mounted upon the three spindles 67 and provision is made that they are alternately directed upward and downward on each spindle. Each of the levers 66 of both outer spindles 67 acts upon the same group of clutches while the levers 68 of the middle spindle 67 act alternately upon one of both groups of clutches. The clutch levers are held in their home position by springs 69. A clutch magnet D may act upon each clutch lever.

Figure 15:
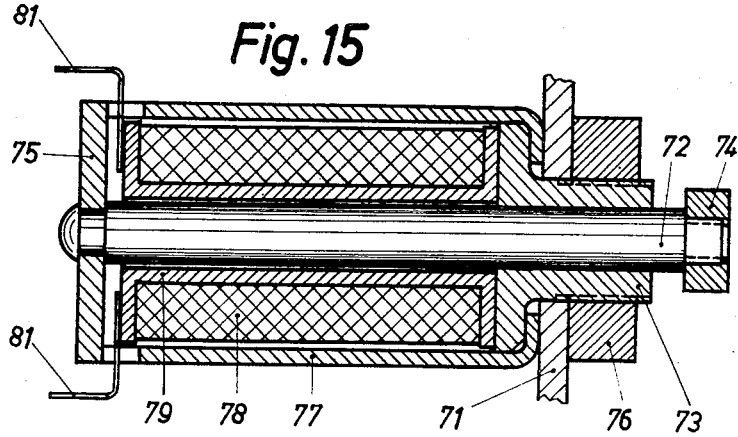
Fig. 15 shows the clutch magnet.

For reasons of space the magnets D have been constructed differently from the usual type. This construction is shown in Fig. 15. This construction affords the further advantage that these magnets can be easily concentrated into a constructional unit on a wall of the machine.

The magnets are here fastened to the intermediate wall 71. More in detail the magnet consists of a core 72 slidable in the sleeve 73. Its movement is limited by the nut 74 and the disk 75. The latter is riveted to the core 72. During assembly the sleeve 73 is drawn by the nut 76 against the wall 71. The cover 77 is then held between wall 71 and sleeve 73 by nut 76. The cover 77 is necessary in order to establish the magnetic circuit. Within the cover 77 there is provided the winding 78 upon the spool 79. In the cover 77 there are provided two slots permitting the soldering terminals 81 to pass through. The nut 74 presses upon the lever 66 or 68 respectively (Fig. 12), and in its rest position is pressed by spring 69 through lever 66 against the sleeve 76. If the magnet is energized (position shown in Fig. 15) the plate 75 is drawn towards the cover 77. The nut 74 presses upon the clutch lever which in turn presses the pawl 48 into the tooth gap of the actuating wheel 51. Through the magnet D there will be only a brief current impulse since for clutching only a brief attraction is necessary. This permits comparatively high currents to flow through the winding without destroying the same by over-heating. Correspondingly to the higher currents therefore, also greater magnetic forces may be exerted than would be possible with normal magnets of the same size.

The type wheels 54 (Fig. 12) are rotatably mounted upon the sleeve 82. In each type wheel there is provided a recess 54a in which engages the pawl 83. The pawl 83 is rotatably mounted upon the stud 84 which is fast on gear 53. The toothed wheel 53 and type wheel 54 are fastened to each other as has already been mentioned. The pawl 83 is pressed by spring 85 against the sleeve 82. The sleeve 82 is provided with a groove 82a. Upon actuation of the type wheel the latter will rotate in clockwise direction whereupon the pawl 83 slides over sleeve 82. While the type wheels are being set the sleeve 82 is stationary. After printing, the sleeve 82 will rotate in clockwise direction. Depending on the position of the type wheel the pawls 83 are engaged by the groove 82a and will be moved by the latter whereby the type wheels are restored to their home position. The drive for the sleeve 82 will be referred to later on.

During printing the types must be exactly aligned. This is achieved in that, shortly before printing, the yoke 86 (Fig. 12) is pressed against the type wheels. In the type wheels grooves are provided in which the point 86a of the yoke 86 will engage and will align the type wheels.

Inking of the type wheels is effected by the disks 87 on the axis 88. The disks 87 draw the ink from the container 89.

The alignment of the type wheels, the printing and the zeroizing take place in the same operation so that their movements may be derived from the same drive. The drive for the same is effected from ratchet wheel 12 (Fig. 10) which makes one revolution per deck or printing cycle, accordingly two revolutions per card passage. The ratchet wheel is fast on the shaft 92, which is mounted in the sleeve 82 (Fig. 12). At the other end of the shaft 92 there are fastened the toothed segment 93 and the two cams 94 and 95. The gear 98 is driven by the toothed segment 93 through reduction gears 96 and 97. Gear 98 is fastened on the sleeve 82 serving for zeroizing. The ratio of the gears as well as the dimensions and the position of the toothed segment have been chosen in such way that zeroizing is effected in the last quarter of the printing cycle, shortly after the printing proper.

The cam 94 causes alignment of the type wheels as well as retraction of the printing hammer. Upon its movement the cam 94 takes with it the lever 101 which is fast on the shaft 102. The printing hammer 91 is also fast on the shaft 102 (Fig. 12). The pinion for the drive of the rollers is freely rotatable on the shaft. In the rest position the lever 101 is urged with its projection against the rubber cushion 100 by spring 103. The rubber cushion is adjustable whereby the position of the printing hammer may be defined. The cam 94 turns the lever 101 in clockwise direction until the cam slides over the lever and causes the latter to snap back. Due to the momentum the rubber will yield so that the hammer will press the cards against the types. The arm 105 is linked to the lever 101 by the connection rod 104, and together with the yoke 86 for the alignment for the type wheels is seated on the shaft 106. Furthermore the locking wheels 57 for the type wheels are freely rotatable on the shaft 106.

The cam disk 95 actuates the contact a, the function of which will be described in detail later on in connection with the circuit diagram.

The perforations in the card are analyzed by the brushes b (Fig. 12). The card is fed past the same step by step. The position of the brushes relatively to the printing device must be defined exactly in such a way that the card will reach the printing position, when the last hole position has passed the brushes. At this moment also the setting of the type wheels is completed. The brushes are maintained in the set of brushes 110 which is fastened on the side walls of the machine by means of the stirrup 107. In addition the brushes are also guided in a comb 108. They are supplied with current by the contact plate 109. The latter is fastened on the side walls of the machine by means of the insulating bar 111 and the stirrup 112.

Card feed

The cards are inserted in the magazine 113 and are fed by the card knives 114 past the rollers 115. The latter feed the cards past the analyzing device and the printing mechanism to the card receiver. There the cards drop on the card support 116 which is guided by rollers 117 and urged upwardly by the spring 118. The contact m is opened by the card support 116 in its lower position by means of which the whole machine is stopped, when the card receiver is filled.

Figure 18:
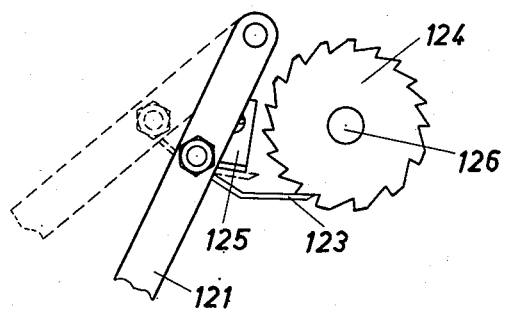
Figs. 18 and 19 show the drive of the pawl for the card feed.
Figure 19:
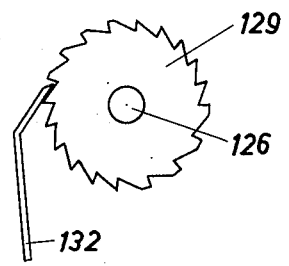

The drive of the feed rollers is effected step by step by the crank 11 (Fig. 10), to which the rocker 121 is connected by link 122. The pawl 123 is mounted on the rocker 121 and is resiliently urged against the ratchet wheel 124 (Figs. 10 and 18). Consequently the ratchet wheel 124 is displaced by one step at one revolution of the crank 11.

The link 122 is provided with a projection 122a, which actuates the contact i. By this means the contact i is closed once at each revolution of the crank 11. The position of the contact in respect to the crank drive has been chosen here in such way that the contact i is closed at the moment at which the crank drive has reached a dead centre position for clutching of the type wheels to their drive. The contact i controls the current impulses through the clutch magnets D of the printing mechanism.

One revolution of the ratchet wheel 124 corresponds to one card cycle of the machine or eighteen revolutions of the crank 11. The distribution of the teeth around the circumference of the ratchet wheel is not regular. This is due to the fact that the card runs more slowly during analysis than during deck or card change. The particular character of the crank drive necessitates that the deck or card change must be completed after three steps, as has already been described above. The pitch upon the ratchet wheel has been determined according to this condition. There also exists a difference between deck and card change. In case of deck change the card need not be fed such a long way as is necessary in case of card change. Accordingly, the pitch will be largest for the card change. The stroke of the pawl has been so dimensioned that the pawl tends to perform a stroke equal to the largest pitch. The exact setting of the stroke of the pawl is obtained by the stop 125 (Fig. 18). By this means skipping of a small pitch tooth is prevented. Together with the gear 127 (Fig. 10) the ratchet wheel 124 is fast on the shaft 126. The gear 127 is in engagement with the gear 128 which is connected with the rollers 125 through a shaft. The ratio of the two gears has been chosen in such a manner that one revolution of the ratchet wheel 124 corresponds to the feed of a card for one card feed. Furthermore the locking wheel 129 and the cam disk 131 (Figs.

16 and 19) are fast on the shaft 126. The spring 132 locks the ratchet wheel 124 by means of the locking wheel and consequently the card feed against backward movement, and determines exactly the various steps for the card feed. The cam disk 131 actuates the contact $u$ for the deck shifting of the elimination keys.

The rocker 134 is connected to the cam disk 131 through the link 133, said rocker being fast on the sleeve 135 (Fig. 12). The lever 136 is also fastened on the sleeve and engages in the arm of the slide 137 by means of a stud and moves the slide on its guide back and forth. The slide 137 carries the card knives 114.

The remaining rollers for the card feed are driven through gears 138 and 139 (Fig. 16) and the upper rollers are urged towards the lower ones by the springs 141.

As follows from the specification the set of analyzers is common to both perforation decks, also the printing mechanism is common to the same, and the printing of the card is effected for all decks in a single card passage. However, in order to permit exclusion from the transfer of any columns of any deck at will, the column selector device is provided which in contra-distinction to the analyzers and the printing mechanism is arranged separately for each deck.

Figure 17:
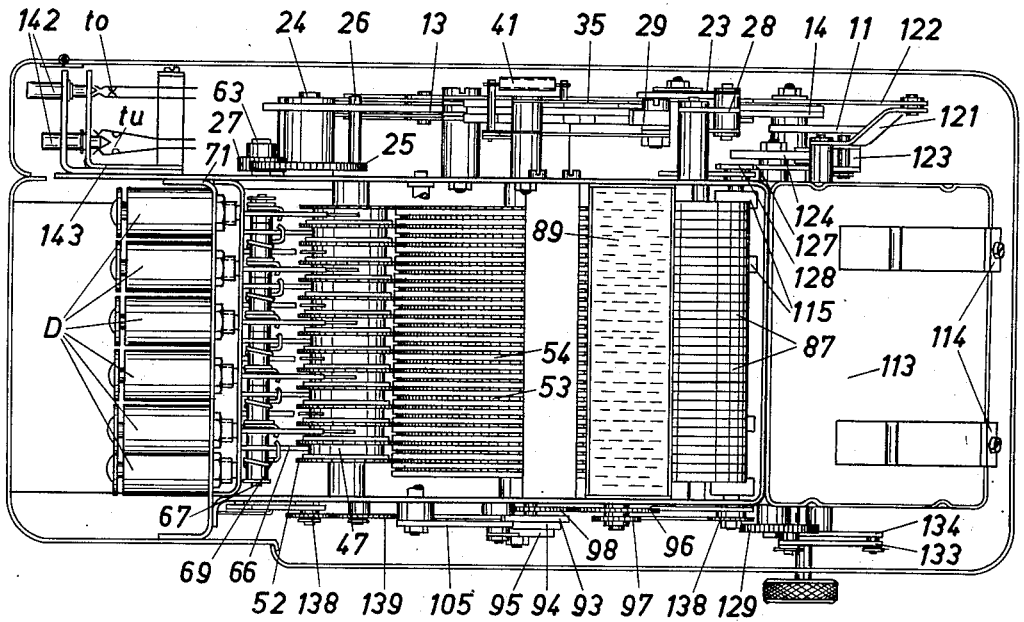
Fig. 17 is a plan of the machine.

The arrangement of the column selector keys will be seen from Figs. 10 and 17. The selector keys are provided at the left hand rear corner of the machine casing in two rows each of 30 keys 142, the rear row being associated with the upper and the front row with the lower deck. The keys are designated by column indications, not illustrated. If a column of any deck is to be excluded from the transfer the respective key 142 is depressed and thereby opens its associated contact $to$ (of the upper deck) or $tu$ (of the lower deck). The key board is of very simple construction. The keys proper are not mounted resiliently since they are held in depressed position between the contact springs and are held in raised position by the cone-shaped ends of the contact springs automatically in the non-operated position.

The keys and the contacts are comprised in a key bar 143 which is provided on the rear side of the machine. The keys are secured against inadvertent displacement by means of a cover mounted on hinges. The operation of the column selector device will be described in connection with the circuit diagram.

*Circuit diagram*

In the illustration of the circuit diagram for the perforation interpreter a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number. The relays and magnets are indicated by capitals and the contacts which they actuate by the corresponding small letters. Manually actuated contacts are characterized by a key-like hook on the upper end of the contact member. Generally, the convention is such that the characters are situated to the right of the associated magnets, and contacts or above the wiring symbol respectively. The contacts are shown in the positions which they occupy when the machine is at rest.

Figure 4:
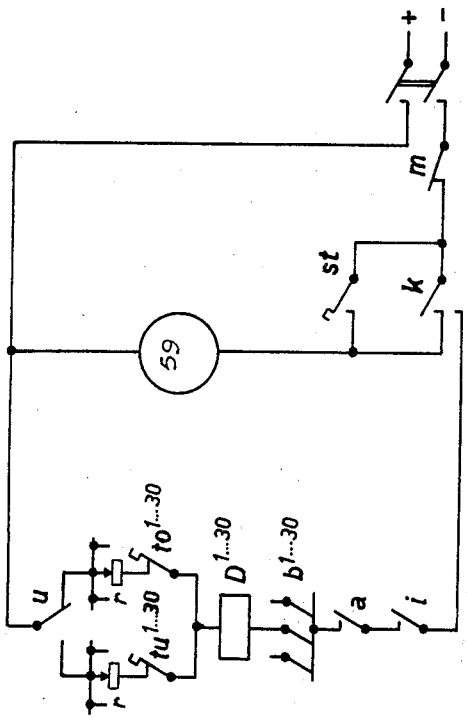
Fig. 4 shows the circuit diagram of the machine.
Figure 8:
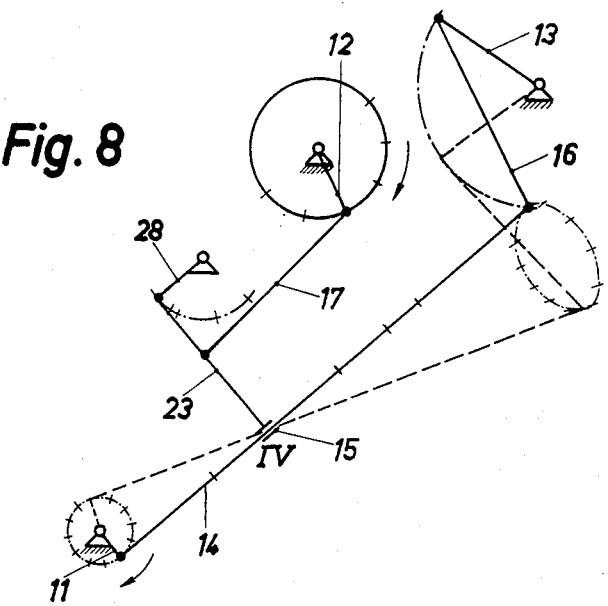
Figure 16:
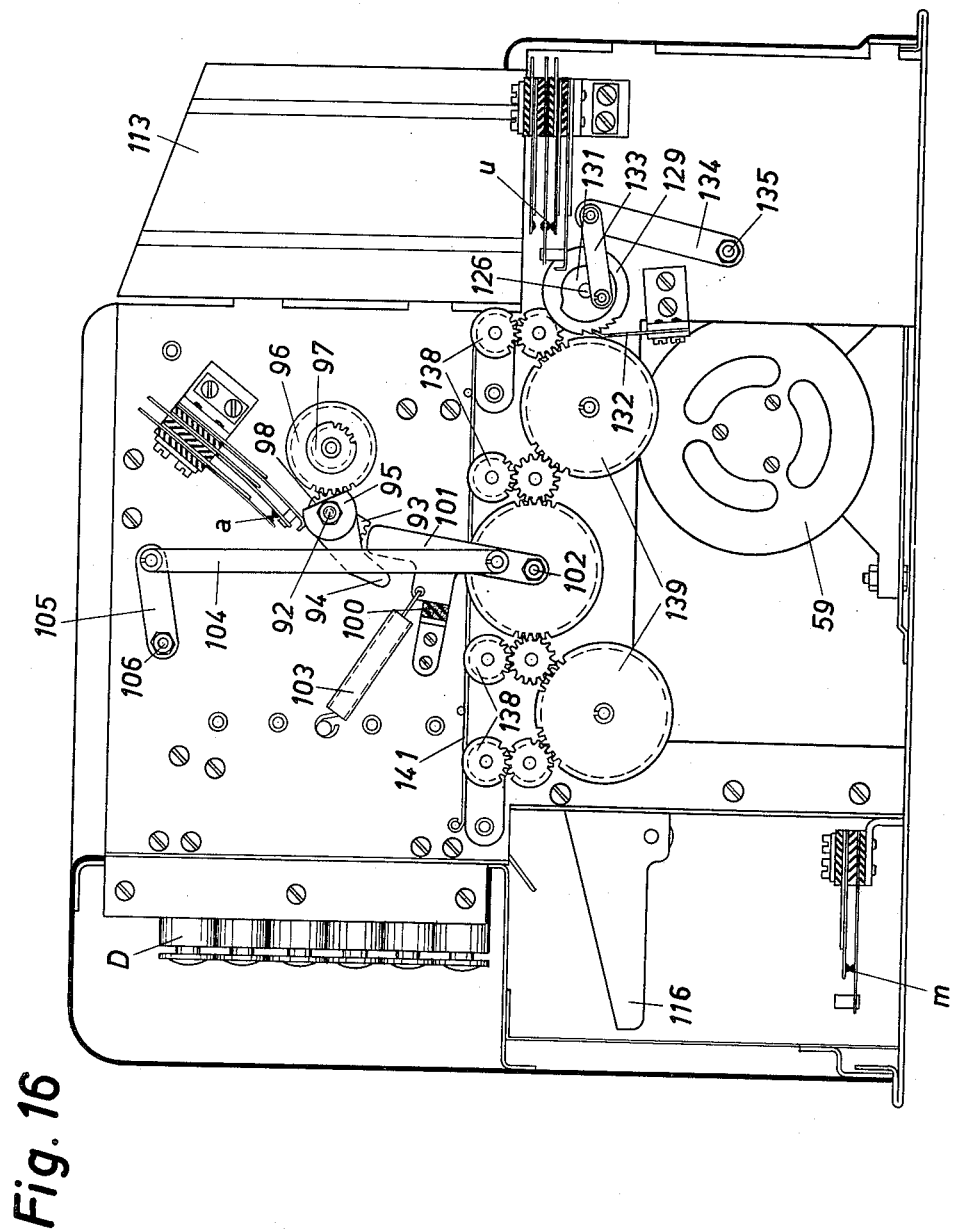
Fig. 16 shows the front view of the machine with the cover removed.

If the machine is switched on it will not start running yet. It is only if the start key $st$ (Fig. 4) is pressed that current may flow from negative through the contact 59, contact $st$, through the motor M to positive. The machine starts to run and feeds cards to the analyzing device. As soon as the first card has reached the analyzing device it will actuate the card lever which is assumed to be known and which has been omitted in the drawings for reasons of clarity. The contact $k$ is closed by its card lever. After the card lever contact has been closed the start key $st$ can be released. The motor will continue to receive current through the card lever contact $k$. Shortly before the first position has reached the brushes the contact $a$ is closed by the cam 95 (Fig. 16). Shortly thereafter when the brushes are directly above the position the contact $i$ also closes (Fig. 10), so that current may flow from negative through the contacts $m$, $k$, $i$, $a$, through the brushes $b$ having passed a hole, through the associated magnets D, through the contacts $to$ and $u$, to positive. In accordance with the perforation the clutch magnets D will respond and will clutch the associated type wheels to the printing mechanism. Before the card is fed to the next position the contact $i$ opens and interrupts the current circuit through the brushes so that the latter open with the current cut off and no sparking will take place. The contact $i$ closes again upon the next position by means of which the clutch magnets D are again energized in accordance with the perforation. When the last position is analyzed the contact $a$ opens so that the current circuit through the brushes will be interrupted during deck or card change. If certain columns which are punched in the card are not to be printed the contacts $to$ associated with the columns will be interrupted by the keys 142, so that no current can flow through the magnets D associated with the columns, although a perforation is provided.

The contact $u$ is shifted by the cam disk 131 during the deck change (Fig. 16) so that now the current does not flow any more through the contacts $to$, but through $tu$. If the first position of the second deck has reached the brush the contact $a$ closes again and the analyzing operation, as described above will start anew, with the difference only that now the current does not flow through the contacts $to$ but through the contacts $tu$. The contacts $tu$ are interrupted in the lower deck according to the desired column eliminations. If the card is analyzed and card change now occurs the contact $u$ will shift the current circuit again to the contacts $to$ and the operation cycle begins anew. To obviate reverse-flowing currents small rectifiers $r$ of a known type are provided in the leads to contacts $to$ and $tu$.

If the card receiver is filled the contact $m$ is opened by the card support by means of which the whole current circuit is interrupted and the machine will stop. The same is obtained if no more cards are fed and the card lever returns to its home position. In this case the contact $k$ interrupts the whole current circuit.

I claim:

1. In an interpreting machine for multi-deck record cards each having a plurality of adjacent record columns in each deck and index marks in said columns, the combination of settable printing means for each card column, said printing means being common to all decks, analyzing means for each card column, said analyzing means being common to all decks, means for feeding each card deck by deck, first past said analyzing means and thence to said printing means, said feeding means including means for successively positioning each card with the consecutive decks thereof in turn in a predetermined printing position relative to said printing means, means for controlling said settable printing means by said analyzing means in accordance with the analysis of said index marks, and a separate set of column selection means for each deck, each settable at will to render the printing means ineffective in respect of the associated column of the respective deck.

2. In an interpreting machine for multi-deck record cards each having a plurality of adjacent record columns in each deck, and index marks in said columns the combination of settable printing means for each card column, said printing means being common to all decks, analyzing means for all card columns, said analyzing means being common to all decks, means for feeding each card deck by deck, first past said analyzing means and thence to said printing means, said feeding means including means for successively positioning each card with the consecutive decks thereof in turn in a predetermined printing position relative to said printing means, means for controlling said settable printing means by said analyzing means in accordance with the analysis of said index marks, and a separate selection key for each column of each deck, each of said keys being individually operable at will to render the printing means ineffective in respect of the deck column associated with the operated key.

References Cited in the file of this patent

UNITED STATES PATENTS

| | | |
|---|---|---|
| 2,105,291 | Maul | Jan. 11, 1938 |
| 2,240,667 | Paris | May 6, 1941 |
| 2,311,471 | Ritzert | Feb. 16, 1943 |
| 2,421,078 | Mueller | May 27, 1947 |
| 2,562,232 | Braun | July 31, 1951 |
| 2,588,190 | Wockenfuss | Mar. 4, 1952 |
| 2,591,128 | Brougham | Apr. 1, 1952 |